(No Model.)
R. LYONS.
HARROW AND CULTIVATOR.
No. 446,624. Patented Feb. 17, 1891.
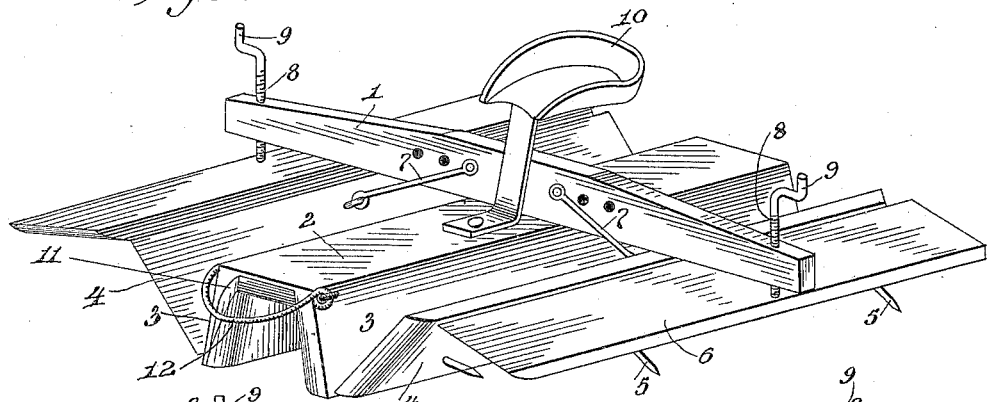
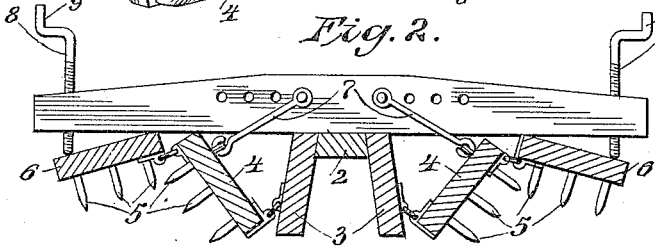
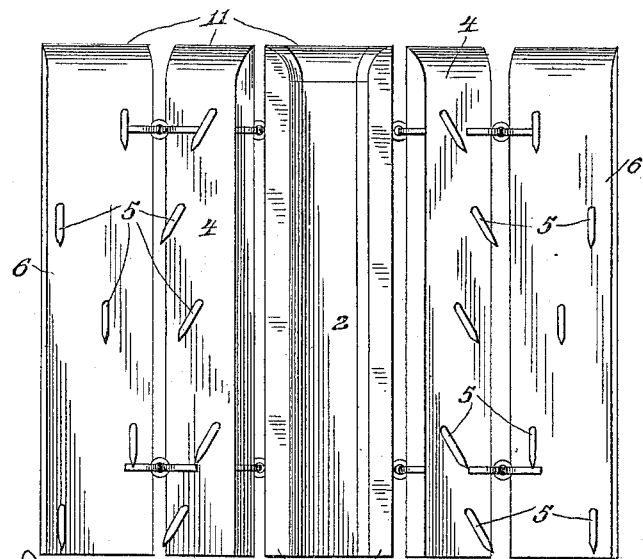
Witnesses
E. M. Gallaher
Wm. Bagger
Inventor
Robt. Lyons
By his Attorneys,
C. A. Snow & Co.

UNITED STATES PATENT OFFICE.

ROBERT LYONS, OF PEIRO, IOWA.

HARROW AND CULTIVATOR.

SPECIFICATION forming part of Letters Patent No. 446,624, dated February 17, 1891.

Application filed October 31, 1890. Serial No. 369,885. (No model.)

*To all whom it may concern:*

Be it known that I, ROBERT LYONS, a citizen of the United States, residing at Peiro, in the county of Woodbury and State of Iowa, have invented a new and useful Harrow and Cultivator, of which the following is a specification.

This invention relates to harrows and cultivators adapted especially to cultivating listed corn; and it has for its object to provide a machine of this class which shall possess superior advantages in point of simplicity, durability, and general efficiency.

With these ends in view the invention consists in the improved construction, arrangement, and combination of parts, which will be hereinafter fully described, and particularly pointed out in the claims.

In the drawings hereto annexed, Figure 1 is a perspective view of a machine constructed in accordance with my invention. Fig. 2 is a vertical transverse sectional view of the same. Fig. 3 is a bottom plan view.

Like numerals of reference indicate like parts in all the figures.

1 designates a cross-bar, upon the under side of which is secured a longitudinal beam 2, at the edges of which are secured the downwardly-extending flanges 3 3, which are flared downwardly, as shown, the lower edges of said flanges being in a full-sized machine about six inches apart, while the upper edges of said flanges may be about four inches apart from each other.

To the lower edges of the flanges 3 3 are hinged the leaves 4 4, the under sides of which are studded with teeth 5. Additional leaves 6 are hinged at the outer edges of the leaves 4, and are likewise provided on their under sides with teeth 5. The leaves 4 are connected by means of braces 7, and the outer ends of the nected adjustably with the cross-bar 1 by cross-bar 1 are provided with vertical adjusting-screws 8, adapted to bear against the upper sides of the leaves 6 near the outer edges of the latter. Said adjusting-screws are provided with cranks or handles 9, by means of which they may be conveniently manipulated.

A seat 10 for the driver is to be suitably mounted upon the upper side of the longitudinal frame-beam 2 of the machine.

The frame-beam 2, flanges 3, and the leaves 4 and 6 are to be beveled at their front ends, as shown at 11, and a clevis 12 for the attachment of the draft is to be suitably secured to the frame of the machine.

The operation of my invention and its advantages will be readily understood from the foregoing description, taken in connection with the drawings hereto annexed. The machine in operation travels in the furrow in which the corn is planted, and the young plants are protected by the flanges 3, which travel on each side of the row. The leaves 4 and 6 may be adjusted by means of the braces 7 and the screws 8 to any desired position, and when the ground is gone over a second time they may be lowered to any desired extent. The beveled front ends of the flanges and leaves of the machine will cause the latter to pass readily over any obstructions that may be encountered, and the leaves may be readily adjusted, so as to cause the machine to travel steadily and without swaying. The weight of the driver will hold the machine firmly to its work, and it will serve to thoroughly pulverize the soil and to cut and chop any weeds and stalks that may be encountered.

Having thus described my invention, I claim and desire to secure by Letters Patent of the United States—

1. In a machine of the class described, the combination of a longitudinal frame-beam having downwardly-extending flanges and provided with a cross-bar on its upper side, the leaves hinged at the lower edges of said flanges and having teeth on their under sides, the braces connecting said leaves adjustably with the cross-bar, the supplemental leaves hinged at the outer edges of the main leaves and having teeth on their under sides, and the adjusting-screws mounted vertically in the outer ends of the cross-bar and adapted to bear against the upper sides of the supplemental leaves near the outer edges of the latter, substantially as and for the purpose set forth.

2. In a machine of the class described, the combination of the longitudinal frame-beam having downwardly-extending outwardly-flaring flanges and provided with a cross-bar on its upper side, the leaves hinged at the lower edges of said flanges and having the supplemental leaves hinged at their outer edges, the braces and screws for the adjustment of the said leaves and supplemental leaves, the teeth extending downwardly from the leaves, and the clevis at the front end of the frame, all arranged and operating substantially as set forth.

3. In a machine of the class described, the longitudinal frame-beam having the downwardly-extending flanges and the hinged leaves and supplemental leaves, all beveled at their front ends, in combination with the cross-bar, the adjustable braces, and the adjusting-screws mounted vertically in the outer ends of the cross-bar, all combined and operating substantially in the manner and for the purpose herein set forth.

In testimony that I claim the foregoing as my own I have hereto affixed my signature in presence of two witnesses.

ROBERT LYONS.

Witnesses:
W. H. H. PETTY,
E. H. BROOKS.